Patented Sept. 12, 1933

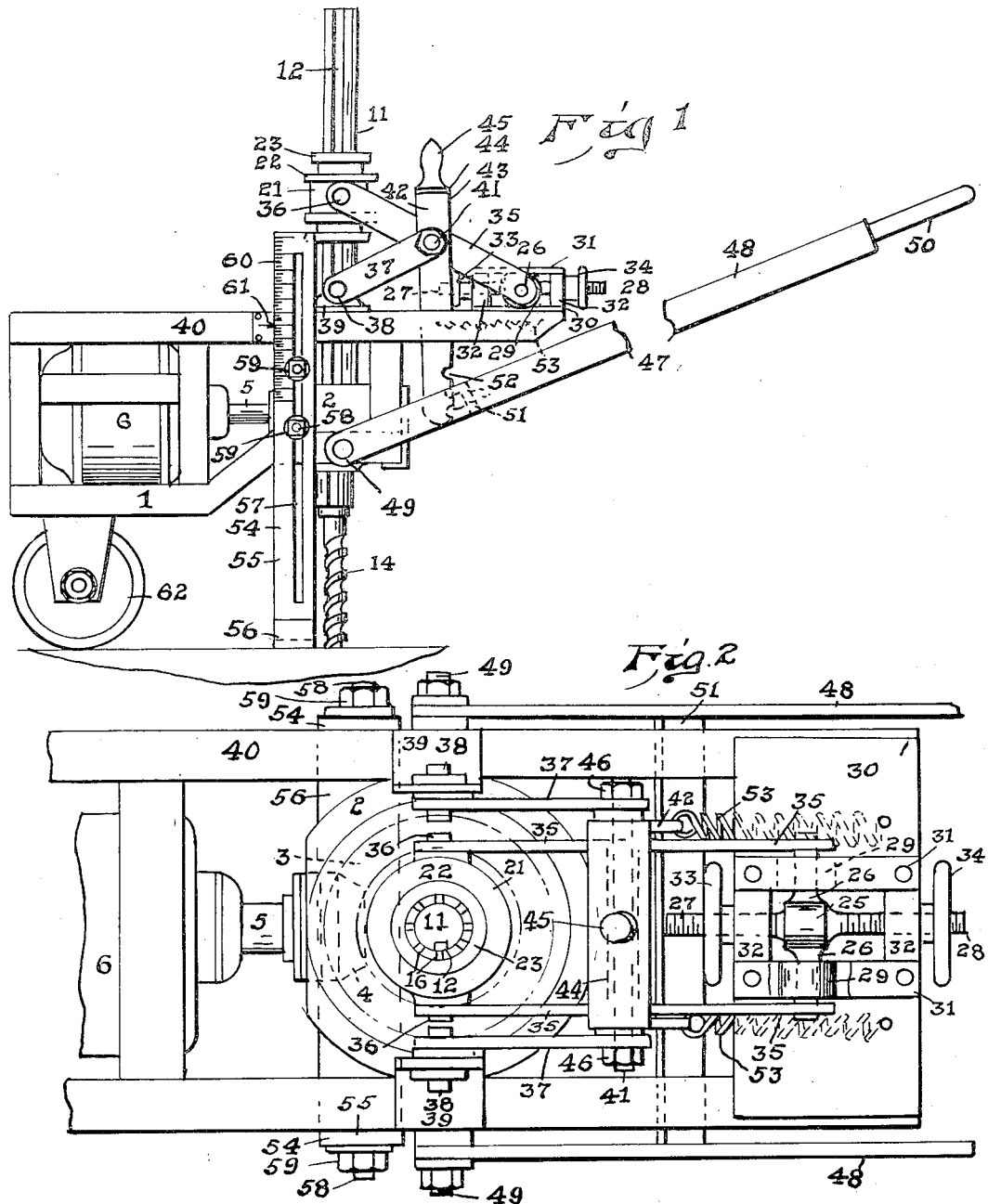

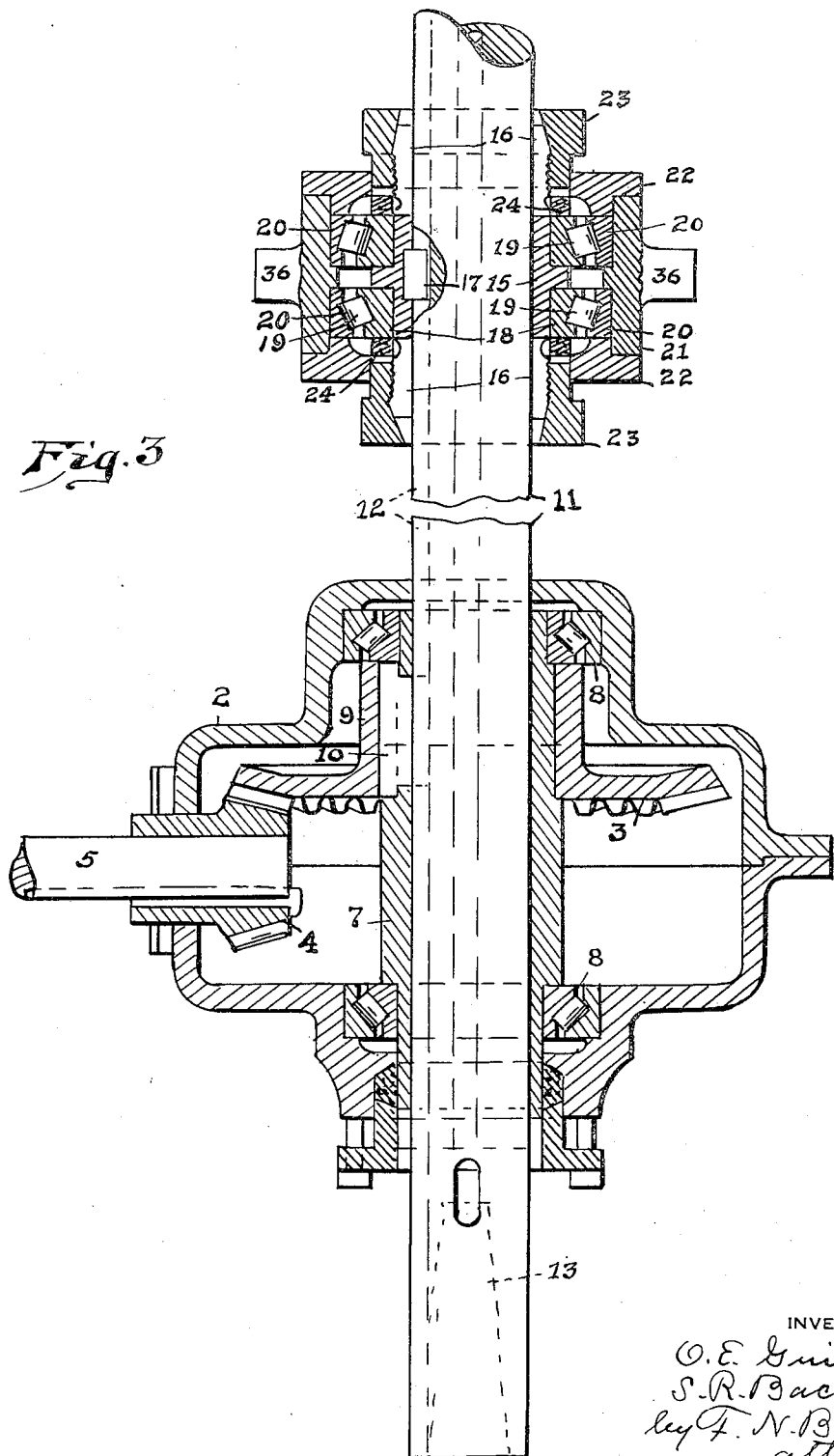

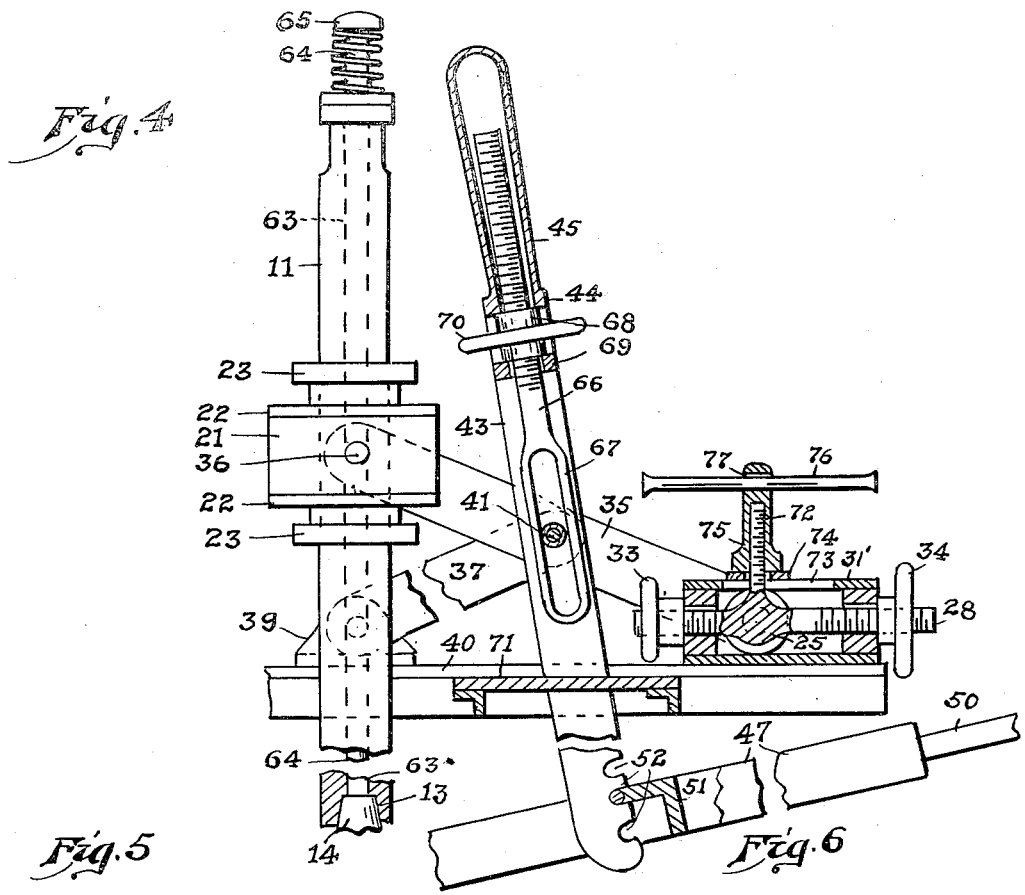
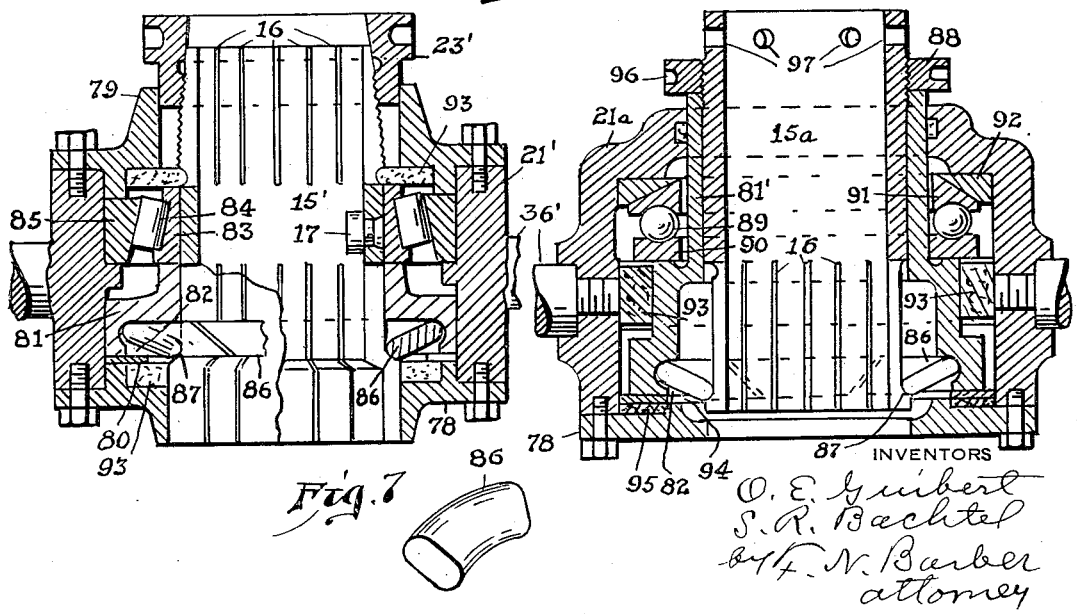

1,927,006

UNITED STATES PATENT OFFICE 1,927,006

PORTABLE MACHINE TOOL

Oscar E. Guibert, Crafton, and Samuel R. Bachtel, Pittsburgh, Pa., assignors to Guibert Steel Company, Pittsburgh, Pa., a corporation of Pennsylvania Original application April 29, 1930, Serial No. 448,218. Divided and this application July 23, 1931. Serial No. 552,580

5 Claims. (Cl. 77—32)

Our invention relates to motor driven rotary machines adapted to drive drills, countersinks, reamers, and the like.

Some of the objects of this invention are to provide a system of levers for causing the working tools of the said machines to be driven longitudinally during their rotation; to provide novel means for accurately predetermining the longitudinal travel of the rotary tool and for locking the tool against the longitudinal travel when the lever system is to be used as a rigid means for moving the machine; to provide a novel means for connecting the rotary tool to the said system of levers; and to provide a novel means for causing the rotary tool to have no rotary movement in its immediate rotary driver and for causing the driver to have rotary motion without longitudinal travel. Other objects appear hereinafter.

This application is a division of our application Serial Number 448,218, filed April 29, 1930.

Referring to the accompanying drawings, Fig. 1 is a side elevation of one form of our invention, a portion being broken away; Fig. 2, an enlarged top plan view of Fig. 1 with parts broken away; and Fig. 3, a view in vertical section of the rotary tool holder with the parts supporting and rotating the same, parts being broken away; Fig. 4, a side view of a modification of the central portion of Fig. 1, parts being in section and broken away; Fig. 5, a longitudinal vertical section of the swivel clamping means for the drill stem; Fig. 6, a central longitudinal section of a modification of Fig. 5; and Fig. 7, a perspective view of one of the elements of the split clamping ring for causing the swivels to be clamped to the spindles.

The machine frame 1 shown in side elevation in Fig. 1 and in plan in Fig. 2 comprises several metal shapes and bars secured together by any selected means such as welding and is carried by the rolling support 62.

The forward part of the frame which extends to a less depth at its underside than the rear portion of the frame is provided with the gear case 2 containing the intermeshing gears 3 and 4, the latter being keyed to the motor shaft 5 driven by the motor 6 in the rear portion of the frame. The hub of the gear 3 is mounted on the vertical sleeve 7 having its ends mounted in antifriction bearings 8 at the upper and lower portions of the gear casing. The hub 9 of the gear 3 and the sleeve 7 are connected together by the key 10. Slidable longitudinally in the sleeve 7 is the tool holder or spindle 11 having from end to end the longitudinal groove 12, into which the key 10 projects and serves as a spline to cause the tool holder to rotate, while allowing it to reciprocate.

The lower end of the tool holder 11 is provided with a socket 13 shown in dotted lines to contain a rotary tool such as the drill 14 accompanying Fig. 1.

The tool holder 11 is provided above the frame with suitable means for regulating the longitudinal movements thereof. For this purpose we provide on the tool support the sleeve 15 having part of its terminal portions externally threaded, and parts tapered outwardly, and provided with longitudinal slots 16. The sleeve carries the spline 17 which extends into the groove 12. This sleeve carries around its central portion the two races 18 for the antifriction rollers 19. The outer faces of the rollers are provided with the races 20 which are surrounded by the collar 21. The upper and lower ends of the collar 21 and the upper and lower ends of the races 20 are closed by the rings 22. There are two nuts 23 which work on the said threaded outer surfaces of the sleeve 15. The nuts 23 may be adjusted to permit the tool holder 11 to slide freely within the sleeve or to clamp the tool holder tightly to the sleeve. Packing rings 24 engaged by the nuts 23 are provided between the races 18 and the end rings 22. The tool holder is of uniform cross section from end to end so that it may be withdrawn entirely out of the machine after the clamping sleeve 15 has released it by movement in either direction.

25 is a cross-shaped member having the two side arms 26 and the two threaded arms 27 and 28. The arms 26 are provided with rollers 29 which travel backwards and forwards between the plate 30 on the forward end of the machine frame and the two metal strips 31 whose ends are secured to the blocks 32 through which the arms 27 and 28 project, these blocks being secured to the plate 30. The arms 27 and 28 are respectively provided with the nuts 33 and 34 which are adapted to be screwed up against the outer faces of the blocks 32. The outer ends of the arms 26 are pivoted to the ends of the levers 35, the rear ends of the levers 35 being pivotally connected to the trunnions 36 at the opposite sides of the collar 21. The links 37 have their rear ends pivotally connected on the pins 38 carried by the ears 39 on the top of the machine frame members 40. The forward ends of the links 37 are pivotally connected to the levers 35 by means of the pivot bar 41 which extends not only through the levers 35 and the links 37, but also through the side members 42 of the vertical swinging member 43. The members 42 are connected together by the top member 44 which is provided with the handle 45. The pivot bar 41 is held in place by nuts 46 bearing against the outer faces of the links 37. The distance between the centers of the pins 38 and the pivot bar 41 is equal to the distance between the pivot bar 41 and the centers of the trunnions 36. The centers of the trunnions 36 and the pins 38 lie in a vertical plane which includes the longitudinal center of the tool holder 11.

47 is a forwardly-projecting handle or lever having its lateral members 48 pivotally connected to the machine frame by the pivot bolts 49. The forward end of the handle 47 has the handle member 50 which an attendant may grasp in order to move the machine or control the longitudinal positions of the tool holder 11. The side members 48 of the handle 47 carry the cross bar 51 which fits in any one of the notches 52 in the forward edges of the side members 42 of the swinging member 43. Springs 53 tend to hold the notches in operative connection with the cross bar 51 when the handle 45 is operated to move the swinging member 43 so as to release the notches from the cross bar.

54 is a leg or support having the vertical side members 55 and the bottom connecting member 56. The side members are provided with longitudinal vertical slots 57, only one shown, guided on the bolts 58 carried by the machine frame. The members 55 may be secured in any selected vertical position by tightening the nuts 59 on the bolts 58. The leg is made adjustable vertically to permit the tool 14 or its equivalent to work at right angles to the surface being worked upon. The member 56 would be located at such a height as to require the tool 14 to enter at right angles into the material being drilled. In case the rolling support 62 is upon the edges of the flanges of an I-beam, the leg 54 would be lowered until the member 56 rests upon the said edges, thus bringing the bottom of the rolling support 62 and member 56 to the same elevation. At least one of the side members 55 of the leg 54 may be provided with a scale 60, the frame 40 having the pointer or index 61 adjacent to the scale. If it is desired to lower the leg two inches below a plane horizontal with the bottom of the roller 62, it can be readily done by setting the scale at the proper point with respect to the pointer 61. Similarly the leg can be raised or lowered any required distance without making any measurements by simply setting the marks on the scale which indicate the distance it is desired to raise or lower the leg opposite the pointer 61. The scale preferably indicates inches and fractions thereof.

With the parts as in full lines in Fig. 1, the spindle 11 is at the top of its upper stroke. The motor being set in operation causes the tool 14 to rotate rapidly. The operator presses down on the handle member 50. This presses the swinging member 43 downwardly, the latter pulling down the pivot bar 41 to which are connected the flexible joints of the toggles, each comprising the link 37 and the right hand half of the lever 35. As the toggles straighten out the pivot bar 41 goes down, the rollers 29 move to the right so as to cause the levers 35 to move the spindle downwardly without any lateral pressure thereon, this being necessitated by the levers 35 being twice the length of the links 37 which are pivoted to the centers of the levers 35 and by the location of the longitudinal center of the spindle and the centers of the trunnions 36 and of the pivots 38 in the same vertical plane and by the rollers 29 having travel at right angles to the axial center of the spindle.

The nuts 33 and 34 are set to allow the tool to be lifted the desired distance above the material to be worked upon and to be lowered so as to drill or countersink a hole the desired depth.

When the handle 47 is raised to elevate the spindle 11 the cross-shaped member 25 travels to the left. The left hand block 32 must be sufficiently far to the left to permit the lower end of the tool 14 to be raised above the work about to be drilled. When the handle 47 is lowered to feed the tool 14 into work, the member 25 travels to the right and the right hand block 32 must be positioned so as to allow the drill to drill the required depth into the work before the member 25 engages the right hand block 32. The blocks 32 act as stops to limit the travel of the member 25 and consequently of the spindle and the tool. By placing the cross-bar member 51 in proper selected notches 52 the operator can easily operate the handle 47 although the level of the floor or ground below the handle is higher or lower than the plane which includes the lower sides of the leg 54 and the rolling support 62.

The spindle can be locked to hold it at any selected elevation by setting the nuts 33 against the adjacent block 32 when the spindle is at such an elevation and it can be locked from movement in both directions by also setting the nut 34 against the right hand block 32. With the spindle locked the operator can move the machine on the support 62 while maintaining the leg 54 above the floor or material below because the handle 47 has a rigid connection with the frame. With the nuts 33 and 34 properly set, the operator can readily after each drilling operation tilt the machine slightly by lifting the handle and moving the machine so as to locate the point of the drilling tool 14 accurately over a selected center mark on the work. As he lifts the handle, the nut by engagement with the adjacent block 32 allows the movement of the handle to be transmitted to the frame of the machine to cause motion thereof on the axle of the rolling support 62. By varying the position of the nuts 33 and 34 the travel of the spindle longitudinally can be varied as desired. The longitudinal travel of the spindle can be limited to any part of the longest possible stroke of the spindle by properly adjusting the nuts 33 and 34.

Referring now to Fig. 4, the spindle 11 is provided with a central longitudinal opening 63 extending entirely from its upper end to the socket 13 or the upper end of the rotary tool 14. Reciprocable in the opening 63 is the rod 64 having at its upper end the head 65, there being a coil spring between the head 65 and the top of the spindle to normally hold the lower end of the rod away from the socket 13. By striking the head 65 a sharp blow the rod is driven downwardly into engagement with the upper end of the tool 14 which is thereby expelled.

The nut 33 may be omitted if desired and the following mechanism used in place thereof: The handle 45 is made hollow to receive the threaded portion of the reciprocable rod 66 which extends down through the top member 44 of the swinging member 43 and has at its lower end the loop 67 in which the pivot bar 41 is positioned. 68 is a nut on the rod 66, working between the lower face of the top member 44 and the cross bar 69 carried by the members 42 below the top member 44. The nut 68 is operated by the hand wheel 70. The frame member 40 carries the horizontal stop plate 71 to limit the downward movement of the bar 66.

In practice, the handle 47 is lowered until the lower end of the drill 14 reaches the extreme end of the stroke desired. Then the rod 66 is lowered by operating the hand wheel 70 until the lower end of the loop 67 strikes the stop plate 71. The machine will then be set so that every time the handle 47 is lowered as far as it will go the bottom of the drill 14 or other tool will always reach exactly the same depth. This same purpose may be accomplished by the wheel 33 as hereinbefore set forth. The hand wheel 70 is usually more accessible than the wheel 33. It is not necessary to dispense with the wheel 33 as it may be used in addition to the hand wheel and the parts operatively connected therewith. In case the pivot bar 41 should have its central portion omitted, the necessity for the loop 67 would be removed and the bar 66 could be continued downwardly as such to the distance reached by the lower end of the loop.

In the construction shown in Figs. 1 and 2, it is necessary to tighten the nuts 33 and 34 against the blocks 32 in order to lock the levers and links so that the handle 47 could be held rigidly with respect to the frame and the spindle. We accomplish the same purpose by providing the cross 25 with the upstanding threaded post 72 which extends upward through the slot 73 in the plate 31' which takes the place of the two plates 31 shown in Fig. 2. A roughened or abraded washer 74 surrounds the post 72 and rests upon the plate 31'. An elongated nut 75 is threaded on the post 72 and is operated by the handle 76 slidable in the transverse opening 77 in the top of the nut. When it is desired to lock the levers and links or to hold the handle 47 in any desired position, the handle is placed in the desired position and the handle 76 is turned to cause the nut 75 to clamp the washer 74 to the plate 31'. The friction between the washer and the plate readily and securely locks the movable parts of the mechanism in a rigid position so that the handle 47 may be used to move the machine in any desired direction without any liability of the spindle or other parts of the machine moving.

On Fig. 5 we show a modification of the swivel apparatus shown in the upper portion of Fig. 3. This swivel apparatus receives the spindle 11 and causes it to turn with it, but allows it to move longitudinally. In Fig. 5 the sleeve 15' has its upper and lower ends provided with longitudinal slots 16 similar to the slots 16 in Fig. 3. The collar 21' is closed by the bottom cap 78 and by the top cap 79. A brass washer 80 rests upon the cap 78 within the collar 21'. Upon this ring 80 rests the slidable ring 81 which has in its lower face the annular recess 82 opening downwardly. The upper part of the ring 81 is engaged by the periphery of the sleeve 15' and supports the inner race 83 which surrounds the sleeve 15' and provides a track for the anti-friction rollers 84 bearing against the outer race 85 lying against the inner face of the collar 21'. The upper end of the sleeve 15' tapers upwardly and has its surface of the outer face threaded to receive the nut 23' whose outer periphery bears against the inner face of the upper cap 79. 17 is the spline corresponding to the spline 17 shown in Fig. 3. The annular recess 82 in the ring 81 is provided with a split ring of segments 86, the ring of segments being tapered downwardly. The upper outer edges of the segments lie in the upper outer corner of the recess 82 while their lower inner edges engage the annular shoulder 87 on the lower end of the sleeve 15'. This shoulder forms outwardly-projecting seats for the lower end of the segments 86. The nut 23' serves to clamp the spindle to the sleeve 15' in the same manner that the nut 16 clamps in Fig. 2 the sleeves 15 to the spindle 11.

It is thus seen that when the handle 47 is moved downwardly to apply pressure to the trunnions 36, the ring 81 is moved downwardly slightly and causes the segments 86 to act somewhat as toggles to press the slotted portions at the lower end of the sleeve 15' more closely in contact with the spindle. Applicants believe that this is a novel feature.

Referring now to Fig. 6, the parts are substantially as in Fig. 5 except that the upper part of the sleeve 15a, which corresponds to the sleeve 15 and the sleeve 15' hereinbefore described, does not have its upper portion slotted. The ring 81' extends upwardly around the cylindrical portion of the sleeve 15a above the slots 16 in the lower end thereof. A nut 88 is screwed upon the outer surface of the sleeve 15a and against the upper end of the ring 81', this upper end of the sleeve 15a extending slightly above the upper end of the collar 21a whose upper end is closed by an integral portion thereof surrounding the upper end of the ring 81'. In Fig. 6 we use a set of ball bearings 89 provided with the horizontal lower race 90 and the upper race 91, 92 being a seat for the race 91.

In Figs. 5 and 6, 93 are felt grease retainers held in annular spaces in the structure described. 94 represents a brass washer beneath the ring 81' and 95, liners beneath the brass washer for the purpose of permitting adjustment.

It is seen that when pressure is applied downwardly on the trunnions 36', the segments 86 are moved to increase the clamping action of the sleeve 15a upon the spindle.

The nut 88 is provided with openings 96 for the insertion of a bar for turning the nut. The sleeve 15a has above the nut the transverse openings 97 to receive a bar for the purpose of holding the sleeve from turning while the nut 88 is being turned.

We find that, when the drilling tool 14 is replaced by a reaming tool, the weight of the drill spindle, the handle 47 and the intervening parts is sufficient to cause the reaming tool to ream holes rapidly without the exertion of any additional pressure on the handle 47.

We claim:—

1. In a machine for drilling, reaming, and the like, a frame, a rotatable tool-carrying spindle thereon, a link pivoted to the frame opposite the spindle, a lever pivoted at one end to the spindle and intermediately to the link, and means causing the remaining end of the second lever to move transversely of the spindle, the distance between the connection of the link and the lever from their pivotal connections of the same with the frame and the spindle being equal, a pendent link connected to an intermediate portion of the lever, a lever pivotally connected to the frame and to the pendent link to operate the spindle vertically, and means on the frame adjustably limiting the travel of the end of the lever not connected to the spindle, whereby the vertical travel of the spindle may be restricted to predetermined limits.

2. In a machine for drilling, reaming, and the like, a frame, a rotary and reciprocable spindle, a lever pivoted at one end to the spindle for moving the spindle longitudinally, a guide on the frame for guiding the remaining end of the lever so as to move that end transversely of the spindle as the first end of the lever swings up and down, and a hand-operated lever connected to the frame and operatively connected with the first lever for so swinging the latter, in combination with means to adjust and limit the endwise travel of the guided end of the lever and thereby to adjust and limit the longitudinal travel of the spindle.

3. In a machine for drilling, reaming, and the like, a rotary reciprocable tool spindle, a swivel carried by the spindle, a lever having one end pivoted to the spindle, a guide lying transversely of the spindle, a member connected to the remaining end of the lever and guided by the said guide, and adjustable means cooperative with the said member and limiting the travel of the member on the guide and thereby limiting the longitudinal travel of the spindle.

4. In a machine for drilling, reaming, and the like, a rotary reciprocable tool spindle, a swivel carried by the spindle, a lever having one end pivoted to the spindle, a guide lying transversely of the spindle, a member connected to the remaining end of the lever and guided by the said guide, roller means carried by the said member and having travel on the guide, threaded arms carried by the inner and outer faces of the said member, and nuts cooperating with the arms and limiting the travel of the said member and thereby the longitudinal travel of the spindle.

5. In a machine for drilling, reaming, and the like, a rotary reciprocable tool spindle, a swivel carried by the spindle, a lever having one end pivoted to the spindle, a guide lying transversely of the spindle, a member connected to the remaining end of the lever and guided by the said guide, adjustable means cooperative with the said member and limiting the travel of the member on the guide and thereby limiting the longitudinal travel of the spindle, and additional means releasably locking the said member from movement.

OSCAR E. GUIBERT.
SAMUEL R. BACHTEL.